US006696003B2

(12) United States Patent
Cediel et al.

(10) Patent No.: US 6,696,003 B2
(45) Date of Patent: Feb. 24, 2004

(54) METHODS FOR MANUFACTURING A MODULE FOR A MODULAR CONVEYOR BELT HAVING A SANDWICH LAYER CONSTRUCTION

(75) Inventors: Luis Cediel, Wollerau (CH); Claudia Susanne Honold, Basel (CH)

(73) Assignee: Habasit AG, Reinach (CH)

( * ) Notice: Subject to any disclaimer, the term of this patent is extended or adjusted under 35 U.S.C. 154(b) by 328 days.

(21) Appl. No.: 09/867,070

(22) Filed: May 29, 2001

(65) Prior Publication Data

US 2002/0180090 A1 Dec. 5, 2002

(51) Int. Cl.[7] ............................................. B29C 45/16
(52) U.S. Cl. ................................... 264/255; 264/328.8
(58) Field of Search ................................. 198/636, 637, 198/638, 850, 851, 853, 844.1; 264/250, 254, 255, 328.1, 328.8, 328.12, 328.17

(56) References Cited

U.S. PATENT DOCUMENTS

| | | | | |
|---|---|---|---|---|
| 3,269,526 A | * | 8/1966 | Imse et al. ................... | 198/853 |
| 3,870,141 A | * | 3/1975 | Lapeyre et al. .............. | 198/853 |
| 4,459,257 A | * | 7/1984 | Baciu ........................... | 264/255 |
| 4,715,802 A | * | 12/1987 | Arai ............................. | 425/130 |
| 5,101,966 A | * | 4/1992 | Lapeyre ........................ | 198/803.14 |
| 5,125,504 A | * | 6/1992 | Corlett et al. ............... | 198/850 |
| 5,156,264 A | * | 10/1992 | Lapeyre ........................ | 198/852 |
| 5,361,893 A | * | 11/1994 | Lapeyre et al. .............. | 198/853 |
| 5,433,910 A | * | 7/1995 | Mukai et al. ................. | 264/255 |
| 5,443,378 A | | 8/1995 | Jaroschek et al. ........... | 425/130 |
| 5,469,956 A | * | 11/1995 | Greve et al. ................. | 198/699.1 |
| 5,558,204 A | * | 9/1996 | Daringer ....................... | 198/778 |
| 5,586,643 A | | 12/1996 | Zabron et al. ............... | 198/853 |
| 5,634,550 A | * | 6/1997 | Ensch et al. ............ | 198/457.05 |
| 5,645,786 A | * | 7/1997 | Okada et al. ................. | 264/255 |
| 5,816,389 A | * | 10/1998 | van Zijderveld ............ | 198/850 |
| 6,030,567 A | * | 2/2000 | Takeuchi ...................... | 264/255 |
| 6,039,964 A | | 3/2000 | Sanduja et al. | |
| 6,103,167 A | * | 8/2000 | Mukai et al. ................. | 264/255 |
| 6,180,042 B1 | * | 1/2001 | Takeuchi et al. ............ | 264/255 |
| 6,474,464 B1 | * | 11/2002 | Horton et al. ............... | 198/853 |
| 6,499,587 B1 | * | 12/2002 | Greve .......................... | 198/853 |

FOREIGN PATENT DOCUMENTS

| | | |
|---|---|---|
| WO | WO 97/44172 | 11/1997 |
| WO | WO 00/37337 | 6/2000 |

* cited by examiner

*Primary Examiner*—Angela Ortiz
(74) *Attorney, Agent, or Firm*—Hodgson Russ LLP (57) ABSTRACT

A module for a modular conveyor belt, is described. The module is of a sandwich layer construction having a core polymeric material completely surrounded by a skin polymeric material. The skin material includes an antimicrobial material for inhibiting bacterial growth on the module, and the conveyor belt is particularly useful for conveying and transporting foods including food processing and food handling applications.

9 Claims, 10 Drawing Sheets

METHODS FOR MANUFACTURING A MODULE FOR A MODULAR CONVEYOR BELT HAVING A SANDWICH LAYER CONSTRUCTION

BACKGROUND OF THE INVENTION

1. Field of the Invention

The present invention relates to beltings and more particularly to a modular conveyor belt comprising interconnected modules of a similar integral construction. The modules comprising the conveyor belt preferably include an antimicrobial material associated therewith to inhibit bacterial growth and which is safe for human contact. More particularly, the modules are formed of an injection molding process as a sandwich layer construction.

2. Prior Art

Modular conveyor belts are well known. For quality control purposes in the food industry it is desirable that the conveyor be readily inspected to assure cleanliness. Government and industry regulations also specify standards of inspection and cleanliness for equipment used in processing products for human consumption. There is, therefore, a need for a conveyor belt having associated therewith an antimicrobial material that inhibits bacterial growth and promotes improved hygiene conditions on the belting through extended wear, and that is safe for human contact. The antimicrobial material must also conform to the regulatory requirements of the country in which it is used. As will be explained in detail presently, the conveyor belt of the present invention built from modules comprising a central core of a first polymeric material completely encased by a polymeric skin of a second material and having an antimicrobial material associated with at least the skin material meets these criteria. This module configuration is referred to as a sandwich layer construction.

SUMMARY OF THE INVENTION

The sandwich layer construction provides a module whose cross-section has a three-layer configuration. The outer or "skin" surface is of a polymeric material containing the antimicrobial material or compound, and the inner or "core" structure consists of another material, preferably a polymeric material. Antimicrobial materials are relatively expensive. In order to inhibit bacterial growth on a module, they only need to be present in the outer regions of the polymeric module. Also, in today's environmentally conscious society, there is an increased emphasis on recycling, which has prompted many molders to look for ways to use reground material.

The sandwich layer module configuration effectively uses reground material as the core since it still has adequate physical properties. This construction takes advantage of the fact that the outer (skin) material is relatively thin, thereby helping reduce the cost of the molded article by minimizing the amount of virgin material and the amount of polymeric material containing an antimicrobial material. According to the present invention, the core of the sandwich module can also be a relatively inexpensive polymeric material, such as polyethylene, in comparison to the skin material which is of a higher grade.

In one preferred molding technique referred to herein as the sandwich molding method, the sandwich configuration is achieved when two polymeric materials are conveyed one after the other into the mold cavity. When the polymeric materials are injected under laminar flow conditions, the injection melt begins to solidify immediately as it contacts the mold wall so that the melt at the center of the flow advances faster than the melt in the vicinity of the mold wall. Accordingly, polymeric material injected later displaces material injected earlier, particularly in the middle of the cross-section of the flow stream, while the melt that contacts the cold mold walls solidifies to form and maintain the outer or skin layer of the module. In this manner, the second polymeric material devoid of the antimicrobial material serves as the core structure and provides the module of the present invention having a sandwich or three-layer configuration.

To ensure that the polymeric material intended to be the core of the module does not mix with the skin polymeric material in the sandwich molding method, the skin material having the antimicrobial material provided therein is always injected first. The core material then follows at a short timed overlap. The overlap in injection of the two materials is necessary to prevent the melt flow front from momentarily stopping which would result in surface blemishes called "knit lines". With this type of timed sequence, the second (core) material must be a subsequent melt stream that flows through the flow cross-section of the first injected antimicrobial-containing polymeric material in order to form the sandwich configuration.

Another preferred method for manufacturing a module having a sandwich layer configuration is termed an over molding method and comprises providing the core of the module in a first mold. The core is then centered in a second mold of a somewhat larger shaped cavity to provide an annulus about the entire surface of the core. A second polymeric material containing the antimicrobial material is then injected into the second mold to fill the annulus and bond to the core as the skin polymeric material.

In that respect, the present invention relates to a modular conveyor belt having antimicrobial characteristics that inhibit bacterial growth and which is safe for human contact, the belting comprising: a plurality of like modules of a polymeric material, each module comprised of a polymeric material and including a first plurality of link ends, a second plurality of link ends and an intermediate section integrally formed with and joining the first and second plurality of link ends, wherein the link ends of each of the modules are releasably engaged between link ends of an adjacent module except for individual link ends disposed at the extreme sides of the module; a pivot rod for pivotally connecting the modules at engaged link ends; and an antimicrobial material incorporated into the polymeric material thereof, wherein the antimicrobial material is selected from the group consisting of antimicrobial compounds based on $Mg^{+2}$, $Ca^{+2}$, $Zn^{+2}$, $Ag^{+2}$, $Cu^{+2}$, $Al^{+3}$, their oxides and hydroxides, zinc pyrithione, imidazole, mixtures thereof, and wherein when the antimicrobial agent is incorporated into the polymeric material comprising the modules, the antimicrobial agent continuously inhibits bacterial growth on the belting and is safe for human contact. Further, the polymeric material comprising the module is in a sandwich layer construction having a first skin polymeric material supported on a second core polymeric material, and wherein the antimicrobial material is incorporated into the skin polymeric material at a greater concentration than that in the core.

It is also contemplated by the present invention that the pivot rod can be of a sandwich molded configuration having the antimicrobial compound concentrated in the skin material.

These and other aspects of the present invention will become more apparent to those of ordinary skill in the art by reference to the following description and to the appended drawings.

DETAILED DESCRIPTION OF THE INVENTION

Figure 1A:
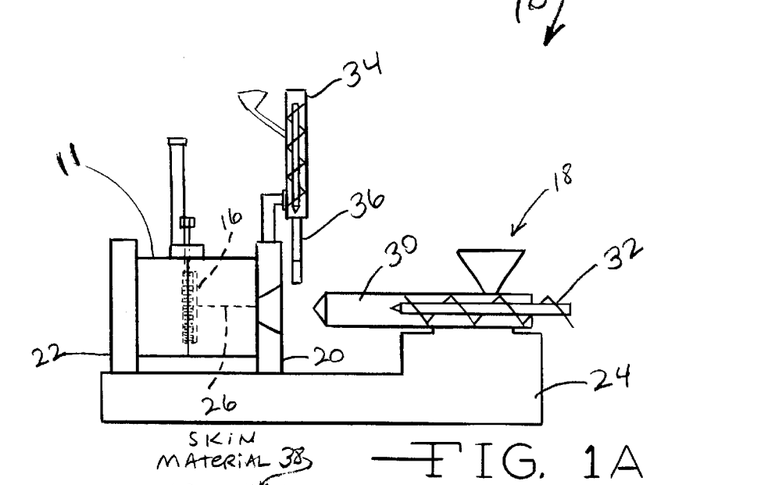
FIGS. 1A to 1C show a diagrammatic section through an injection molding apparatus suitable for manufacturing a module for a modular conveyor belt according to the present invention.
Figure 1B:
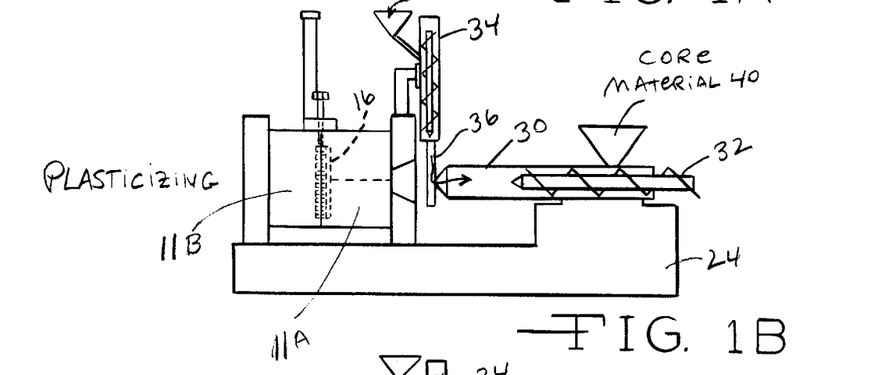
Figure 1C:
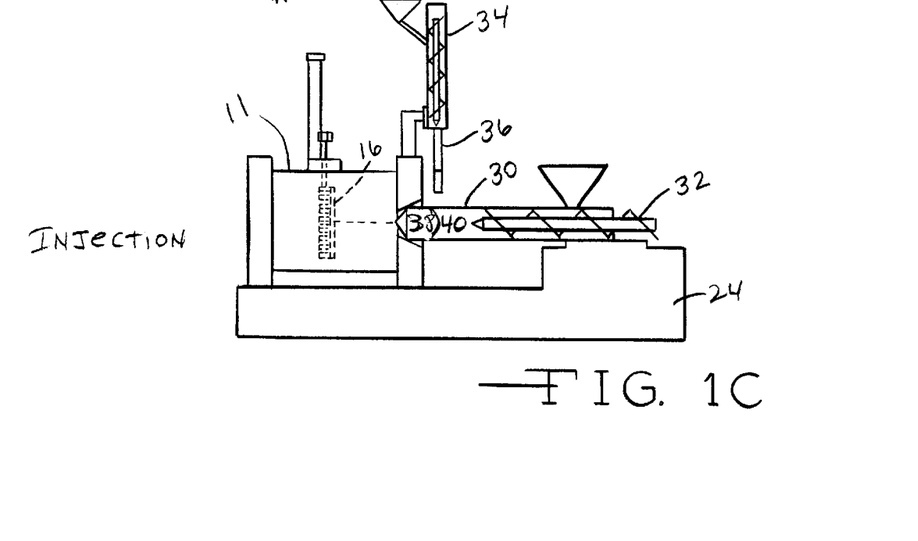

Turning now to the drawings, FIGS. 1A to 1C show a sandwich molding apparatus 10 including a mold 11 for making a sandwich module for a modular conveyor belt according to the present invention. An exemplary sandwich layer constructed flat top module 12 is shown in FIGS. 2 to 4 and 9 to 15 and an exemplary sandwich layer constructed radius module 14 is shown in FIGS. 5 to 8. The structure of these modules will be described in detail below.

The mold 11 for producing the modules 12, 14 having a sandwich layer construction includes first and second mating mold halves 11A, 11B forming a mold cavity 16 for receiving a plastic melt from an injection unit 18. The mating mold halves 11A, 11B are mounted on a stationary platen 20 and a moving platen 22, respectively. The stationary platen 20, moving platen 22 and injection unit 18 are supported by a common base 24. The mold 11 includes a sprue channel 26 through the first mold half 11A which is in fluid flow communication with a nozzle 28 on the injection unit 18 when material is injected into the mold cavity 16. The nozzle 28 is equipped with a shut-off valve (not shown) of the type that is well-known in the art.

The main injection unit 18 has a barrel 30 which includes a feed screw 32 of a configuration that is typical for injection molding. The feed screw is controlled to reciprocate in the barrel 30 to plasticize and inject plastic into the mold 11. The injection unit 18 is equipped with means, such as a hydraulic cylinder (not shown), to move the unit 18 linearly toward and away from the mold 11. More specifically, the injection unit 18 is moved against the mold 11 for injection, then is retracted away from the mold 11 and stationary platen 20, so that a second polymeric skin material can be fed into the injection unit barrel 30. The significance of a polymeric skin material will be described in detail below.

An auxiliary plasticizing unit 34 is mounted adjacent the injection unit 18 on the stationary platen 20 and is capable of movement along a line perpendicular to the injection unit 18. Connected to the end of the auxiliary plasticizing unit 34 is a hot runner manifold 36. This orientation of the auxiliary unit 34 facilitates its positioning so that the hot runner manifold 36 is properly aligned in front of the injection unit 18, enabling direct connection with the nozzle 28. The auxiliary unit 34 is a non-reciprocating extruder; however, it could also be a second reciprocating screw injection unit, if desired.

A cycle of operation for the production of a sandwich layer module made by a sandwich molding method according to the present invention will now be described with respect to FIGS. 1A to 1C. The injection unit 18 is retracted to a rearward position (FIG. 1A), that provides clearance between the stationary platen 20 and the nozzle 28. The auxiliary unit 34 is then moved downward so that the hot runner manifold 36 is disposed in front of the injection unit 18. The nozzle 28 of injection unit 18 then moves against the hot runner manifold 36 to establish a fluid tight connection between the injection unit 18 and the auxiliary unit 34. The auxiliary unit 34 is then activated to transfer plasticized skin material 38 via the hot runner manifold 36, through the nozzle 28 and into the end of the barrel 30 of the injection unit 18, causing the screw 32 to move backward within the barrel. As shown in FIG. 1B, transfer of the skin material 38 from the auxiliary unit 34 continues until a sufficient volume of polymeric material as defined by the module 12, 14 geometry has been transferred.

When the transfer of the polymeric skin material 38 is complete, the injection unit 18 plasticizes a sufficient quantity of the core material 40 by rotating and retracting the feed screw 32 in a conventional manner so that a full shot of melt is prepared. Simultaneously with the plasticizing function, the injection unit 18 disconnects from the auxiliary unit 34 by retracting slightly. The auxiliary unit 34 moves upward so that the injection unit 18 can now move forward unobstructed to a position where the nozzle 28 communicates with the sprue channel 26 of the mold 11. As shown in FIG. 1C, the injection unit 18 then injects the accumulated shot of skin polymeric material 38 followed by the core polymeric material 40 into the mold 11 by advancing the feed screw 32 in a manner typical of the injection molding process.

Now that the molding apparatus 10 has been described in detail, an exemplary flat top module 12 and an exemplary radius module 14, both having a sandwich layer construction provided by a sandwich molding process or method according to the present invention, will be described. The modules 12 and 14 preferably include a broad spectrum antimicrobial agent associated therewith to inhibit bacterial growth on the module 12 while being safe for human contact. More particularly, the modules 12 and 14 are manufactured by the injection molding apparatus 10 shown in FIGS. 1A to 1C with the antimicrobial material predominantly incorporated into the polymeric material of the skin layer.

Figure 2:
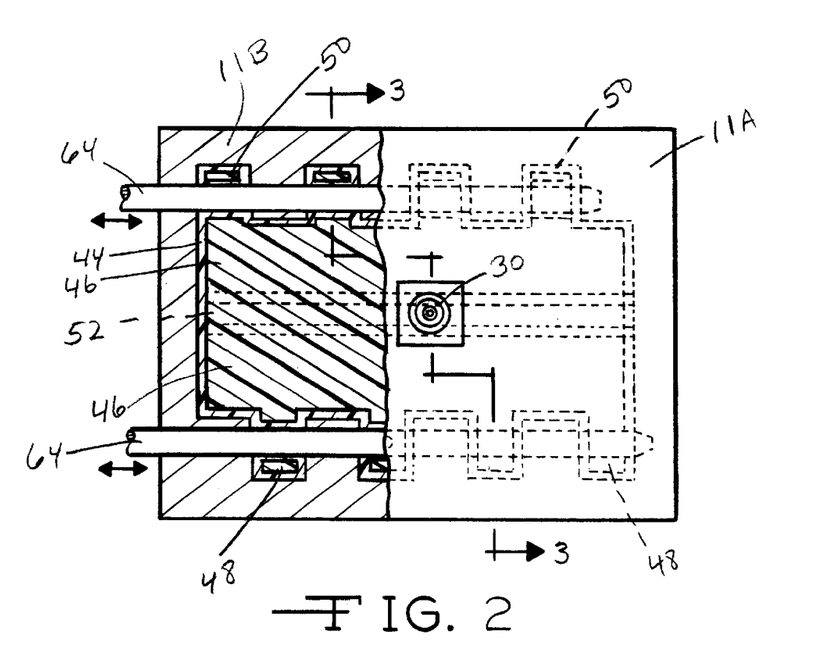
FIG. 2 is a plan view, partly broken away, of one embodiment of a mold for the sandwich molding method for constructing a flat top module according to the present invention.
Figure 3:
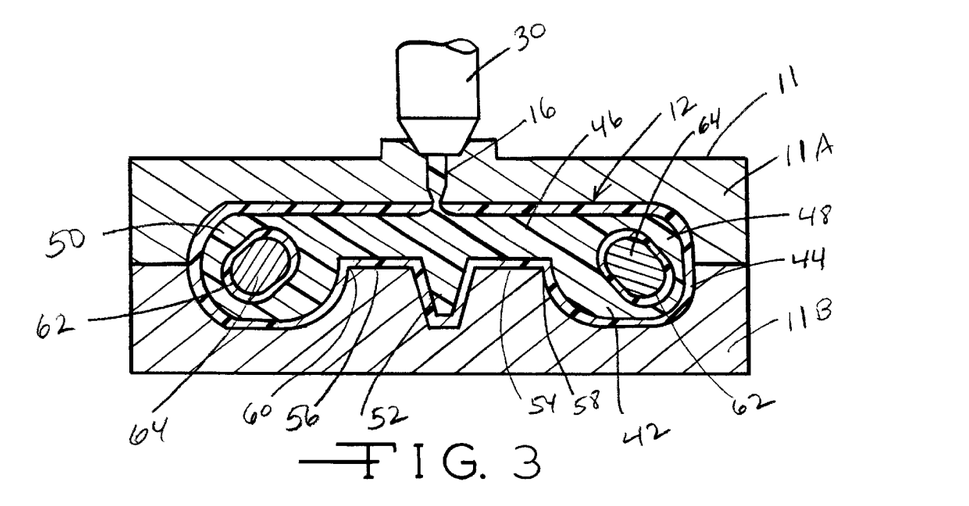
FIG. 3 is a cross-sectional view along line 3—3 of FIG. 2.
Figure 4:
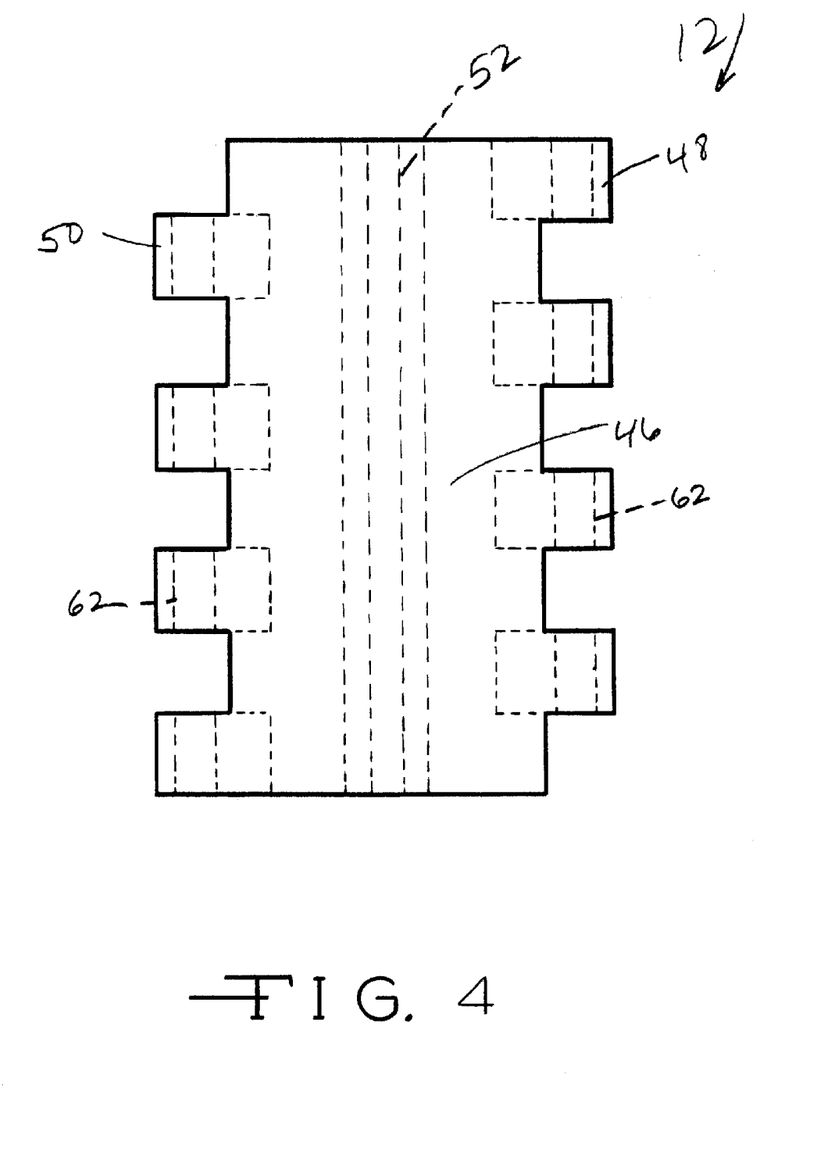
FIG. 4 is a plan view of a flat top module according to the present invention.

FIGS. 2 and 3 show the flat top module 12 being formed inside mold 11 while FIG. 4 shows the module 12 in its final form. The sandwich construction flat top module 12 comprises a core portion 42 surrounded by a skin portion 44. The polymeric material comprising the skin portion 44 contains the antimicrobial materials of the present invention. These include inorganic antimicrobial materials based on $Mg^{+2}$, $Ca^{+2}$, $Zn^{+2}$, $Ag^{+2}$, $Cu^{+2}$, $Al^{+3}$, their oxides and hydroxides, zinc pyrithione, imidazole, and mixtures thereof. The concentration of the antimicrobial material in the polymeric material of the skin portion 44 preferably varies from about 0.5% to about 10.5%, by weight. The polymeric material of the core portion 42 preferably contains little if any of the antimicrobial materials. If the core portion 42 does contain antimicrobial materials, their concentration is preferably less than that of the skin portion 44. Otherwise, the polymeric materials for the core and skin portions can be the same or different. Suitable polymeric materials include polyethylene, polypropylene homopolymer or copolymer, POM and ABS.

The sandwich construction flat top module 10 includes a generally rectangular plate-like body 46 having a first plurality of link ends 48 and a second plurality of link ends 50 extending in opposite directions therefrom. A transverse rib 52 extends across the width of the underside of the body 46 to form opposed channels 54 and 56 terminating at respective edges 58 and 60 from which the respective link ends 48 and 50 project. The rib 52 and the inside of the link ends 48, 50 are adapted to mate with corresponding sprocket teeth of a sprocket wheel (not shown) to impart a driving force to the conveyor belt formed by the interconnected modules 12. The under structure of the module 12 formed by the transverse rib 52 serves to strengthen the module and to prevent any significant binding of the module 10 about its longitudinal or transverse axes.

The link ends 48 and 50 circumscribe corresponding aligned cylindrically shaped openings 62. The openings 62 are provided by the provision of similarly shaped rods 64 in the mold 11 (FIGS. 2 and 3) and receive pivot pins or rods (not shown) adapted to pivotally connect a plurality of the modules in an end to end configuration while laterally aligning adjacent modules to form a modular conveyor belt (not shown). Preferably, the modules 12 are of link end configuration to be end-to-end reversible. In other words, either end of a module can mate with either end of any other link module.

Figure 5:
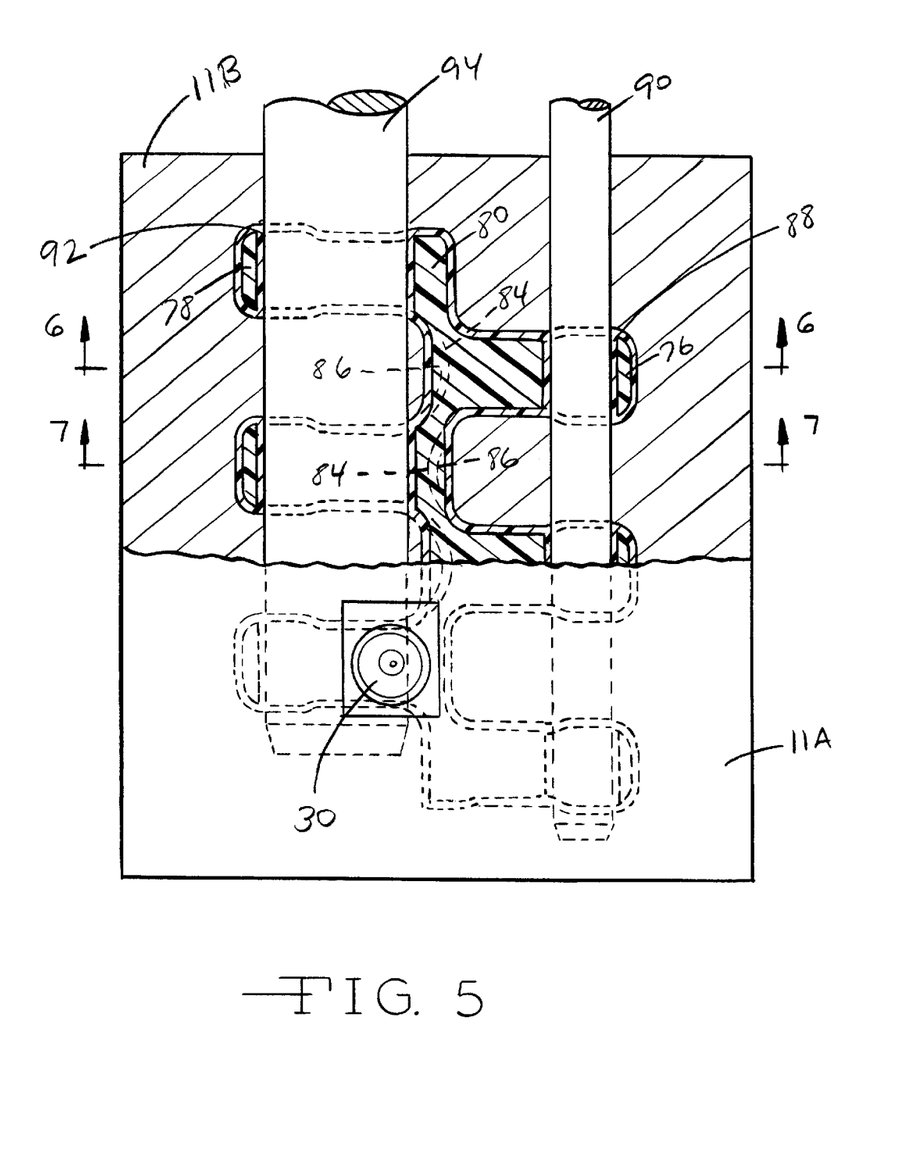
FIG. 5 is a plan view, partly broken away, of one embodiment of a mold for the sandwich molding method for constructing a radius module according to the present invention.
Figure 6:
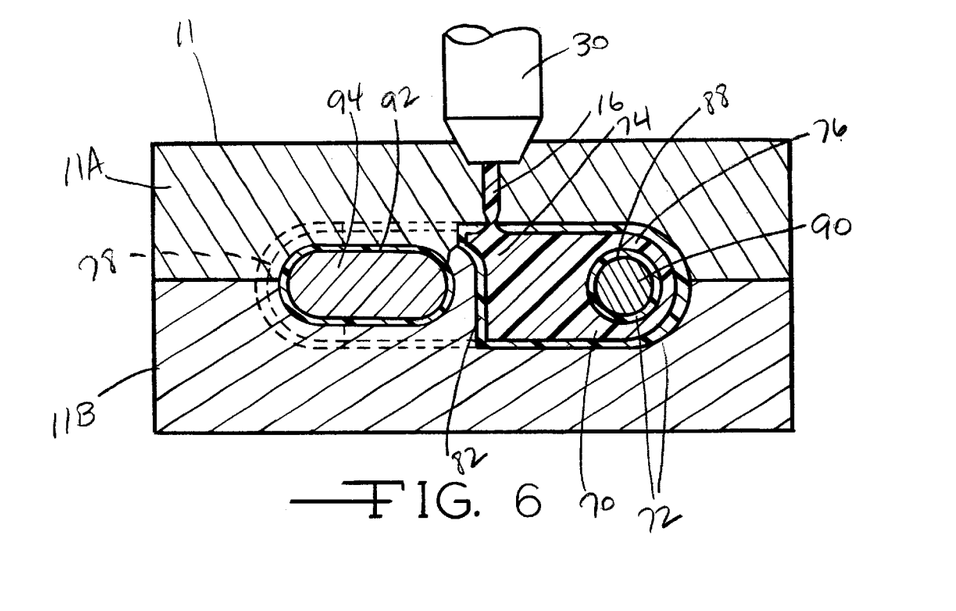
FIG. 6 is a cross-sectional view along line 6—6 of FIG. 5.
Figure 7:
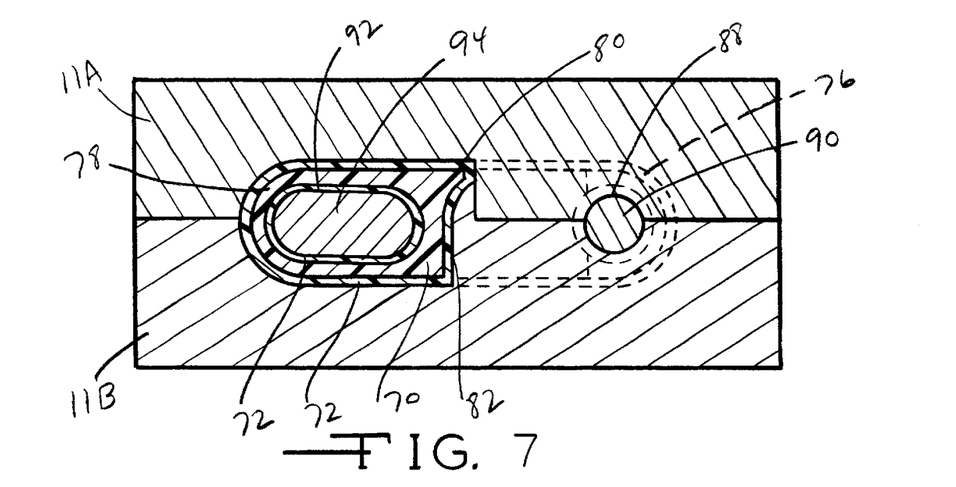
FIG. 7 is a cross-sectional view along line 7—7 of FIG. 5.
Figure 8:
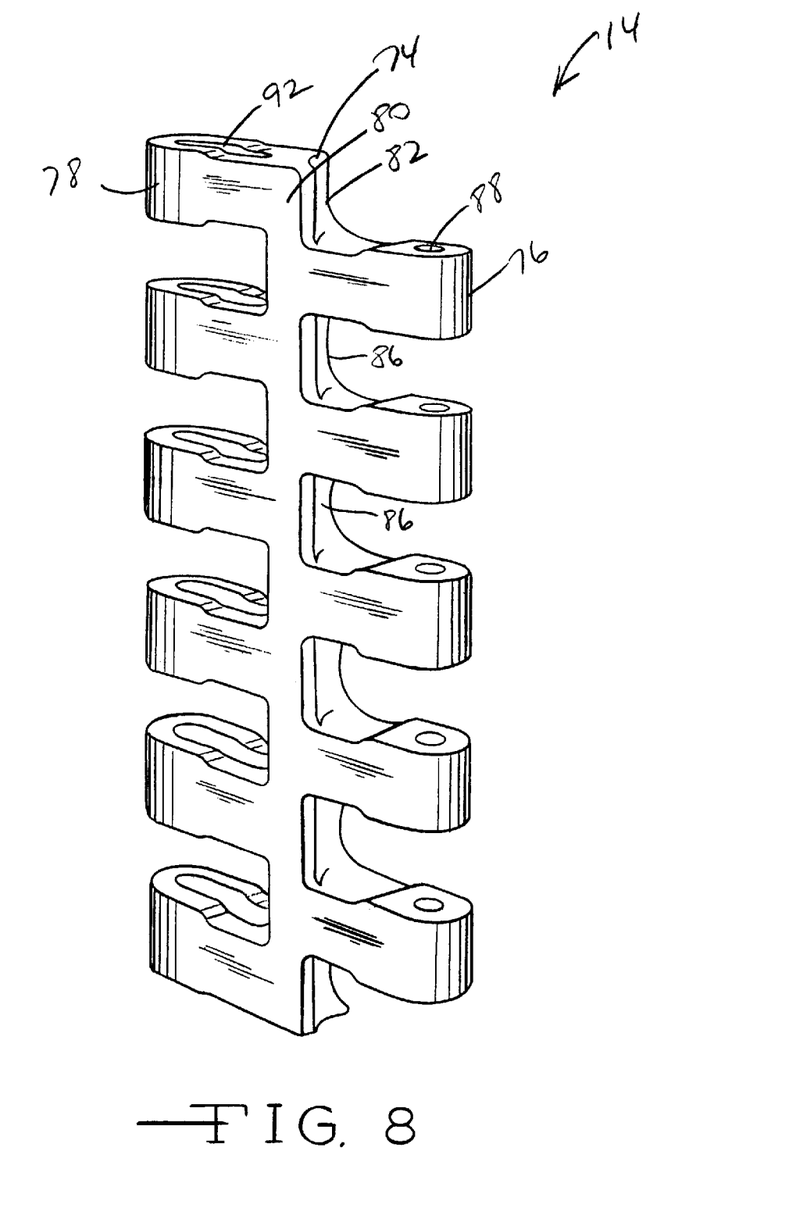
FIG. 8 is a perspective view of a radius module according to the present invention.

FIGS. 5 to 7 show another embodiment of a sandwich construction module, in this case a radius module 14, being formed inside the mold 11, while FIG. 8 shows the module 14 in its final form. The module 14 is referred to as a radius module because, as will be described in detail below, it is adapted for construction of conveyor belts that are capable of traveling around a radius turn. In a similar manner as the flat top module 12, the radius module 14 is of a sandwich construction comprising a core portion 70 surrounded by a skin portion 72. The module 14 further has an intermediate section 74 supporting a plurality of first link ends 76 and a plurality of second link ends 78. The first link ends 76 are disposed in the direction of belt travel and the plurality of second link ends 78 extend opposite the first link ends 76. The intermediate section 74 is comprised of an upper, transverse stiffening web 80 forming into a lower corrugated portion 82. The corrugated portion 82 forms a series of ridges 84 and valleys 86 in a sinusoidal manner. Along with the transverse web 80 of the intermediate section 74, the ridges 84 extending toward the right of FIG. 5 support the first link ends 76 while the ridges 84 extending toward the left in the drawing support the second link ends 78.

Module 14 further includes generally cylindrically-shaped pivot rod openings 88 in link ends 76 provided by the provision of a cylindrical rod 90 in the mold 11. Similarly, oblong slots 92 are disposed through the link ends 78 transverse to the direction of belt travel. The oblong slots 92 are provided by the provision of a similarly shaped rod 94 in the mold 11. With a plurality of modules 14 forming a conveyor belt, a pivot rod (not shown) passes through the openings 88 in the first link ends 76 and through the slots 92 in the second link ends 78. The pivot rod preferably cannot move in the direction of belt travel inside the openings 88. However, due to the oblong shape of slots 92, the pivot rod pivots inside the slots 92. This enables a conveyor belt constructed of a plurality of the modules 14 to travel around a radius turn by collapsing on one side while the other side fans out due to the pivoting of the pivot rod in the oblong slots 92. For a more detailed description of a radius module, reference is made to U.S. application Ser. No. 09/579,090, filed May 25, 2000, which is assigned to the assignee of the present invention, and incorporated herein by reference.

It is further contemplated by the scope of the present invention that the polymeric material comprising the skin portion 44 of the exemplary flat top module 12 and the skin portion 72 of the exemplary radius module 14 may include additives other than those which impart antimicrobial characteristics. These include additives such as those that enhance electrical conductivity (carbon black and graphite particle fillers), flame retardants and pigments. As with the antimicrobial material, these additives are preferably provided in the polymeric material in a concentration of about 0.15% to about 10.5%, by weight.

Figure 13:
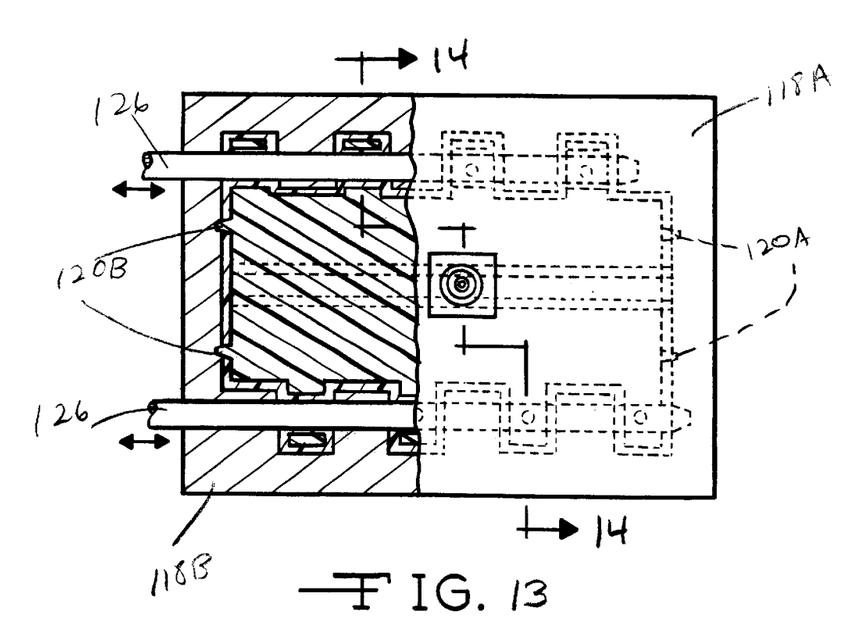
FIG. 13 is a cross-sectional view of the second mold housing the module shown in FIG. 12 having a skin polymeric material molded to the core of the module.
Figure 14:
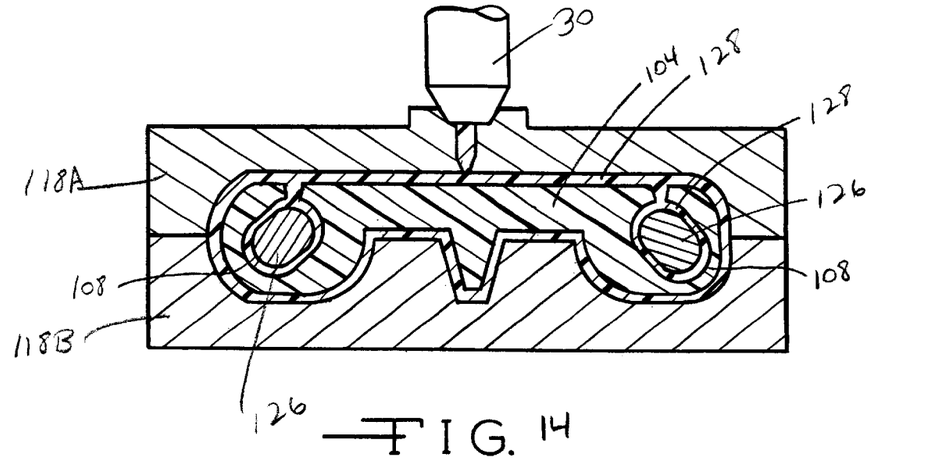
FIG. 14 is a cross-sectional view along line 14—14 of FIG. 13.
Figure 15:
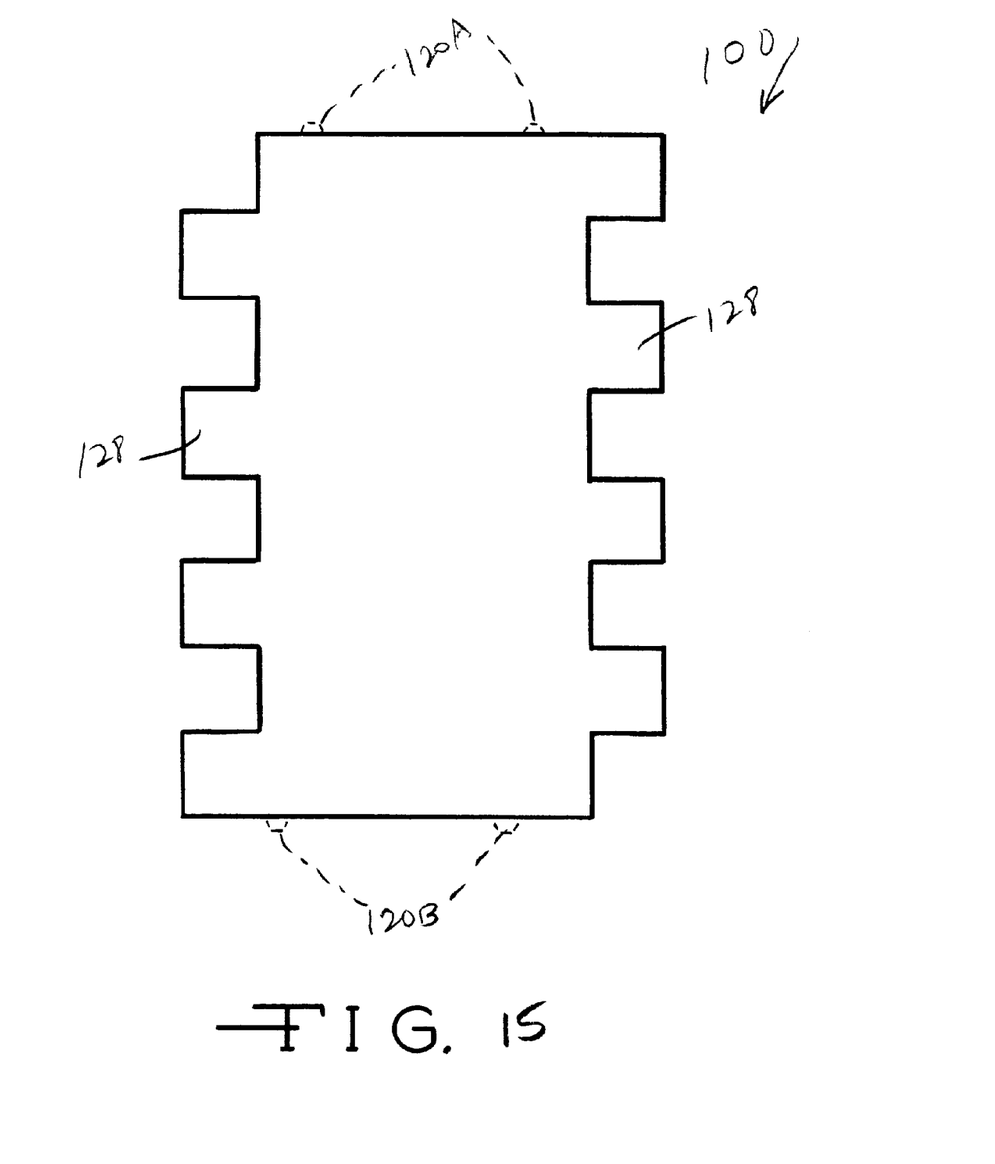
FIG. 15 is a plan view of a flat top module made by an over molding process according to the present invention.

FIGS. 9 to 15 show a second embodiment for manufacturing a flat top module 100 of a sandwich layer construction having antimicrobial characteristics by an over molding process according to the present invention. FIGS. 9 to 14 show the module 100 being formed while FIG. 15 shows the module 100 in its final shape. It should be pointed out that module 100 is similar in structure to the module 12 of FIGS. 2 to 3, and for that reason its structural details will not be described again.

The over molding process begins with a first mold 102 of mating mold halves 102A and 102B providing a first cavity for a core 104 of the flat top module 100. The mold halves 102A, 102B support rods 106 having the shape, but not the exact size of the pivot rod openings 108 (FIG. 14) provided in the link ends of the completed module. For the same reason that the first mold cavity for the core 104 of the module is somewhat under sized, the openings 110 (FIG. 11) provided in the link ends by rods 106 are enlarged with respect to the final size of the pivot rod openings 108.

The first mold half 102A includes first and second extension portions 112 and 114 which depend into the mold cavity to contact the rods 106. That way, when the injection unit barrel 30 is moved against the mold half 102A to inject the core polymeric material into the first cavity, there is provided a break or channel 116 (FIG. 12) communicating through the thickness of each link end.

Figure 9:
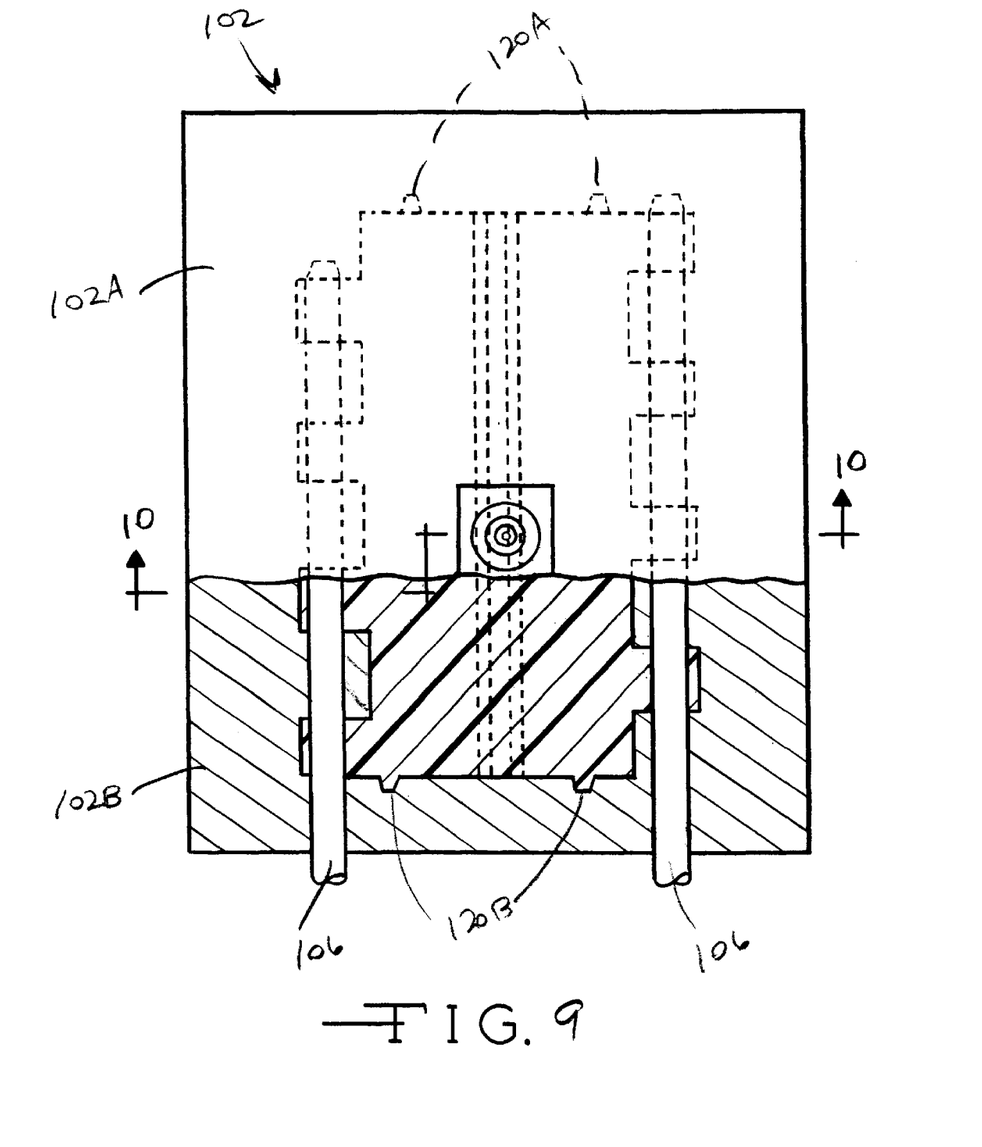
FIG. 9 is a plan view, partially broken away, of another embodiment of a mold for an over mold method for constructing a flat top module according to the present invention.
Figures 10, 11:
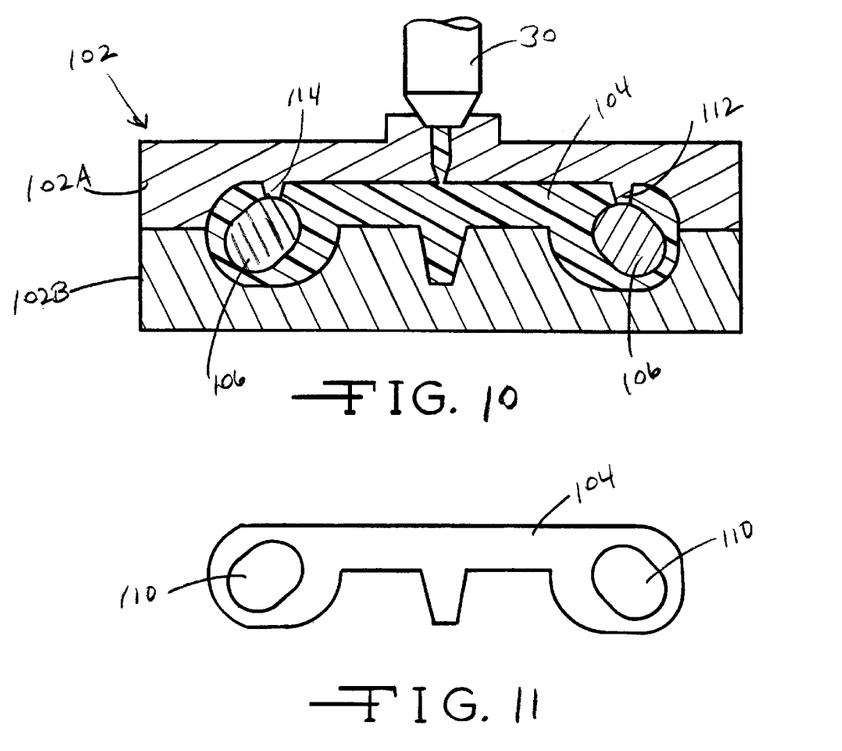
FIG. 10 is a cross-sectional view along line 10—10 of FIG. 9.
FIG. 11 is a side elevational view of the core for a flat top module made by the over molding process.

The core 104 shown in FIG. 11 is then positioned in a second mold 118 (FIGS. 11 to 14) comprising mating mold halves 118A and 118B providing a second cavity that is somewhat greater in size about the entire periphery of the core 104. FIGS. 9 and 14 further shows that the core 104 is provided with two pairs of spaced apart tabs 120A and 120B at its opposed ends. These mate with similarly sized indentations in mold half 118B for suspending the core 104 inside the second cavity. In that manner, mold 118 provides an annulus space 122 about the entire outer surface of the core 104. This annulus space is generally consistent, however, it need not be. In fact, those skilled in the art will readily understand that the core 104 can have a myriad of different sizes and shapes, which are not limited to that of the final module 100 shape.

Figure 12:
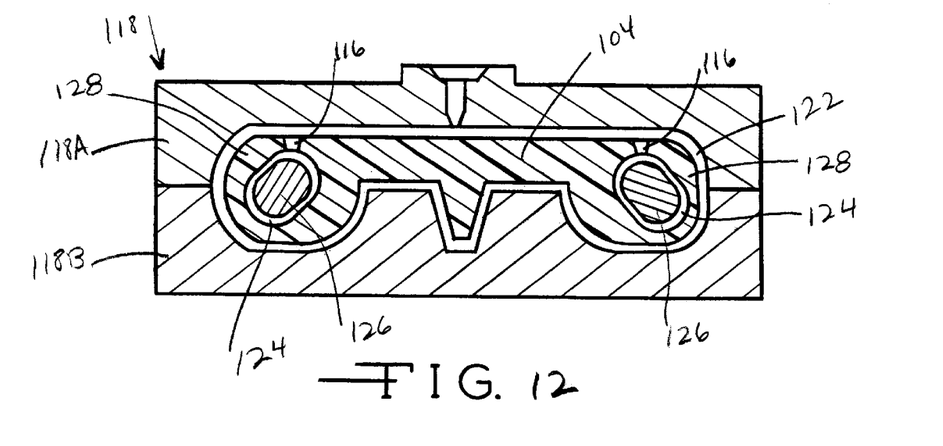
FIG. 12 is a cross-sectional view of the module shown in FIG. 11 positioned in a second mold for finishing the flat top module.

As shown in FIG. 12, the location of the extension portions 116 now provides for communication between the annulus space 122 and a pivot rod space 124 between rods 126 and the inside of the link ends 128. Rods 126 are sized smaller than the rods 106 used with the mold 102 to manufacture the core 104 by the intended thickness of the skin 128 to be molded about the core 104.

As shown in FIGS. 13 and 14, the injection unit barrel 30 is moved against the mold half 118A to inject the skin polymeric material into the second cavity and completely about the perimeter of the core 104. The skin polymeric material is similar to that described for this purpose with respect to the injection molding process shown in FIGS. 1A to 1C and includes the antimicrobial materials. That way, the skin 128 material bonds to the core material to completely encase the core 104, including inside the link ends 128, except for where the tabs 120A, 120B reside at either end of the core 104.

FIG. 15 shows the finished flat top module 100 of this embodiment of the present invention. This module is similar to the flat top module 12 shown in FIG. 4 except for the presence of extending tabs 120A, 120B. The tabs are then removed in a conventional manner such as by being ground off, and the module 100 is ready for use.

While the present invention has been described with respect to the exemplary flat top modules 12, 100 and the radius module 14, that is by way of example only. Those skilled in the modular belt arts will readily recognize that the present molding process can be used to manufacture a variety of modules including flush grid modules, raised rib modules and flight modules as well as various accessories for modular conveyor belts such as sprockets, pivot rod, side guards, finger boards, and the like. In short, the sandwich construction of the present invention can be used to manufacture any component for a modular conveyor belt where it is desired to have an antimicrobial material incorporated into the polymeric material of the component.

It is intended that the foregoing description be only illustrative of the present invention and that the present invention be only limited by the hereinafter appended claims.

What is claimed is:

1. A method for providing a module for a modular conveyor belt, comprising the step of:

a) providing a molding apparatus having a main injection unit with a barrel housing a feed screw, and an auxiliary plasticizing unit;

b) providing a mold with a cavity configured to the shape of the module being produced;

c) transferring a first quantity of a first polymeric material from the auxiliary plasticizing unit into the barrel of the main injection unit;

d) transferring a second quantity of a second polymeric material from the main injection unit into the barrel so that the barrel contains both the first polymeric material and the second polymeric material in discrete shots loaded into the barrel;

e) connecting the barrel with the mold and actuating the feed screw so that the first polymeric material is first injected into the mold to form a skin for the module followed by the second polymeric material injected into the mold to form a core for the module; and f) removing the module from the mold, the module comprising a first plurality of link ends, a second plurality of link ends and an intermediate section integrally formed with and joining the first and second plurality of link ends, wherein the polymeric material comprising the module is in a sandwich layer construction having the first polymeric skin material supported on the second core polymeric material.

2. The method of claim 1 including providing the first polymeric material having an additive material incorporated therein.

3. The method of claim 2 including providing a first concentration of the additive material in the second polymeric material being greater than a second concentration of the additive material in the first polymeric material.

4. The method of claim 3 including providing the first concentration of the additive material in an amount of about 0.15% to about 10.5%, by weight.

5. The method of claim 2 including selecting the additive material from the group consisting of an antimicrobial material, an electrical conductivity material, a flame retardant and a pigment.

6. The method of claim 5 including selecting the antimicrobial material from the group consisting of compounds based on $Mg^{+2}$, $Ca^{+2}$, $Zn^{+2}$, $Ag^{+2}$, $Cu^{+2}$, $Al^{+3}$, their oxides and hydroxides, zinc pyrithione, imidazole, and mixtures thereof.

7. The method of claim 1 including selecting the module from the group of flat top modules, radius modules, flush grid modules, raised rib modules, and flight modules.

8. The method of claim 1 including providing a short timed interval between injecting the first polymeric material and the second polymeric material into the mold.

9. The method of claim 1 including providing the second polymeric material as a recycled material.

* * * * *